July 28, 1942.   C. W. JOHNSON   2,291,160
COMBINATION LAWN TOOL
Filed Sept. 21, 1940   2 Sheets-Sheet 1
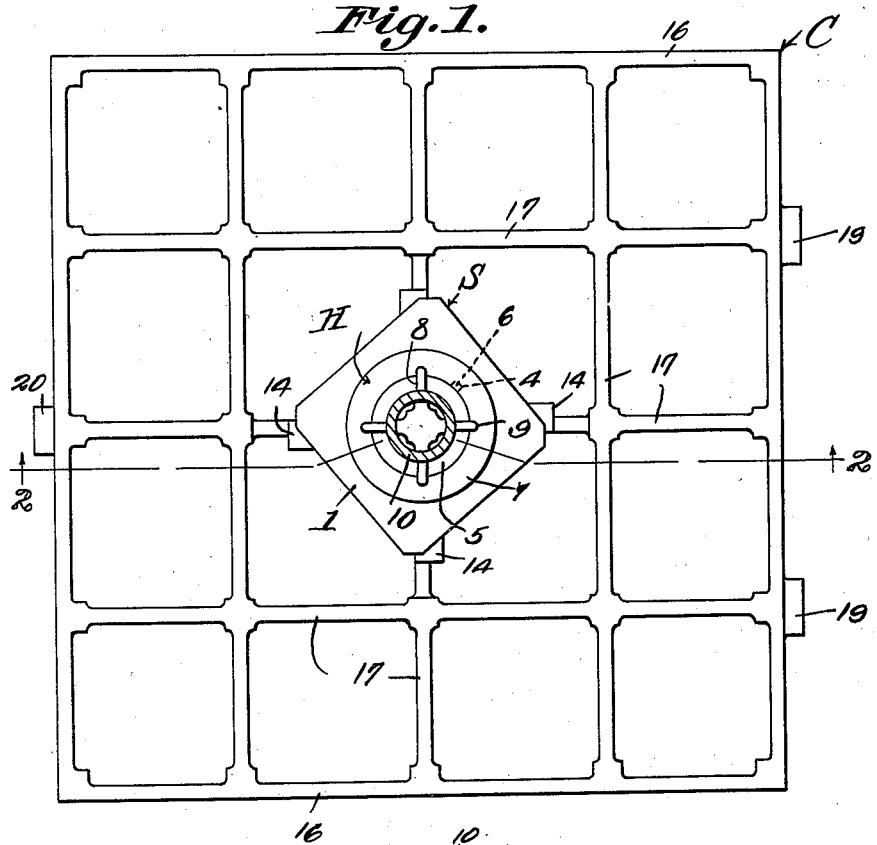
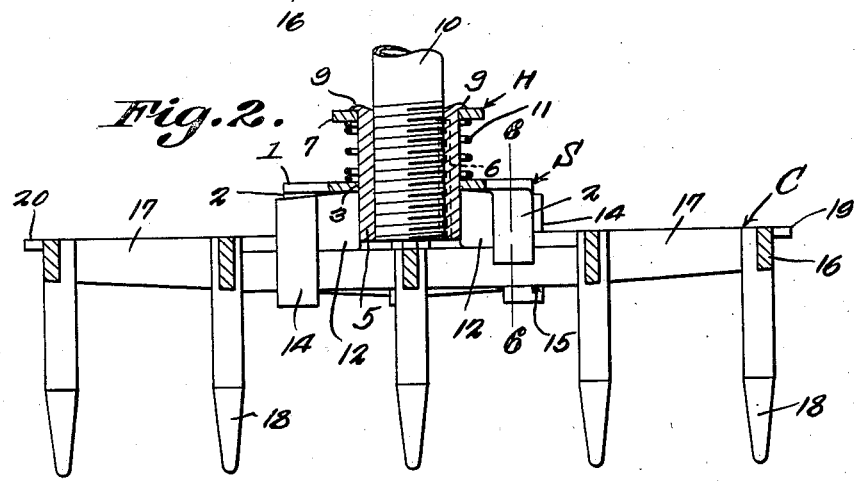
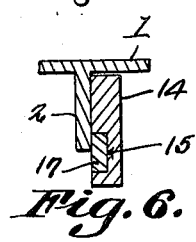
C. W. Johnson
INVENTOR.
BY
ATTORNEYS.

July 28, 1942.  C. W. JOHNSON  2,291,160
COMBINATION LAWN TOOL
Filed Sept. 21, 1940   2 Sheets-Sheet 2
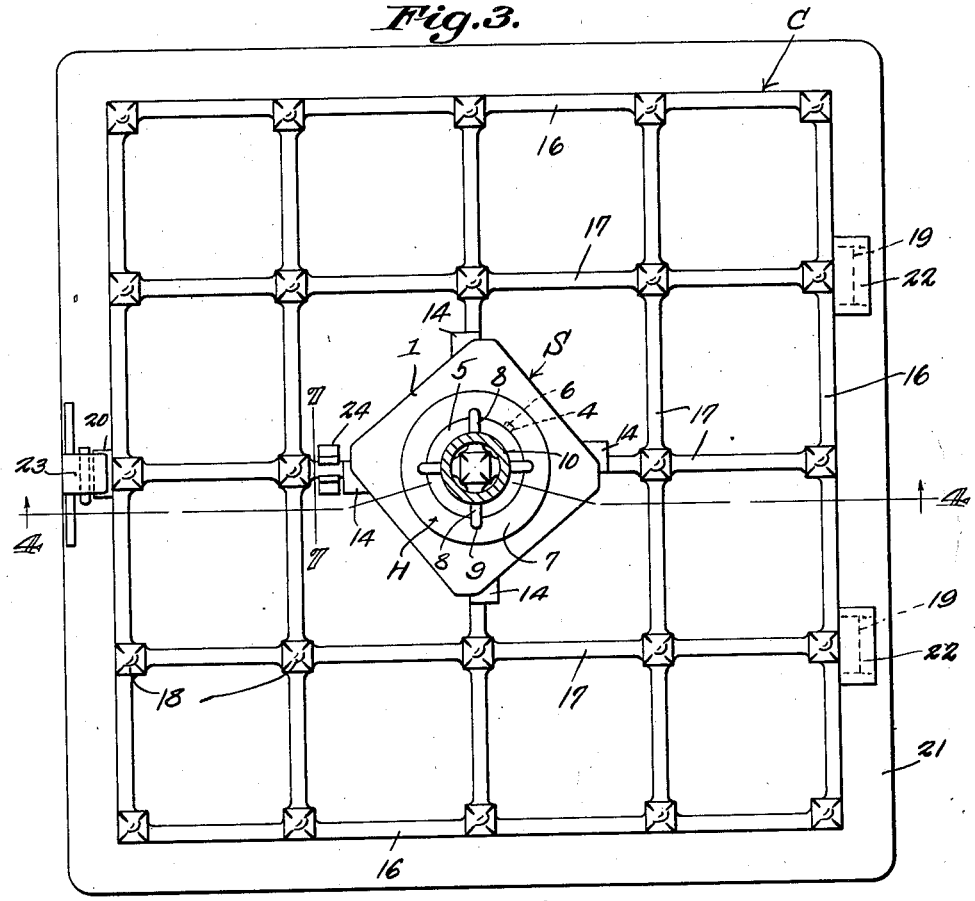
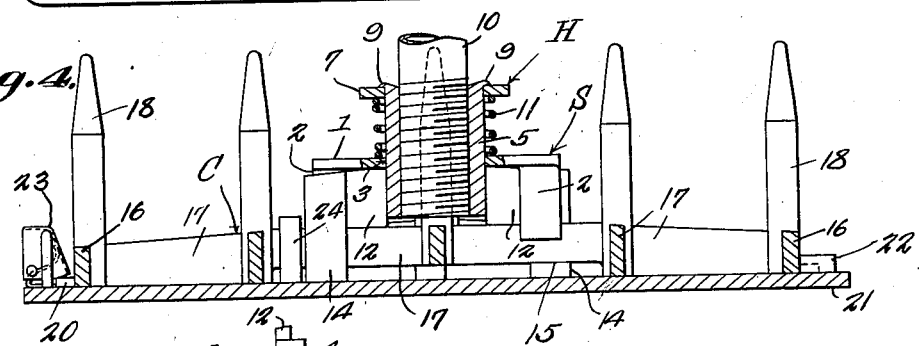
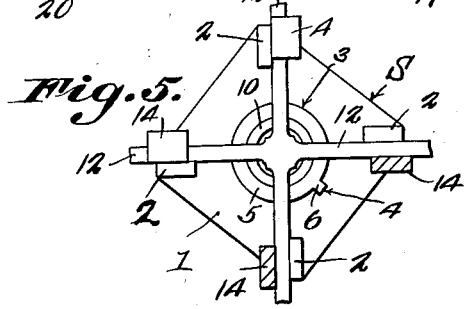
C. W. Johnson
INVENTOR.
BY *Ashnow & Co.*
ATTORNEYS.

Patented July 28, 1942

2,291,160

UNITED STATES PATENT OFFICE 2,291,160

COMBINATION LAWN TOOL

Charles W. Johnson, Chicago Heights, Ill.

Application September 21, 1940, Serial No. 357,807

3 Claims. (Cl. 47—1)

This invention aims to provide a novel tool assembly, adapted to be used by gardeners and others, to loosen the soil, to break up clods, and to tamp the soil. A further object of the invention is to provide a novel coupling for holding the members of the tool assembly connected to a handle.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in top plan, a device constructed in accordance with the invention;

Fig. 2 is a section on the line 2—2 of Fig. 1;

Fig. 3 is a top plan showing a tamper associated with a compound soil working tool which forms part of the invention;

Fig. 4 is a section on the line 4—4 of Fig. 3;

Fig. 5 is a bottom plan wherein parts are sectioned away;

Fig. 6 is a section on the line 6—6 of Fig. 2;

Fig. 7 is a section on the line 7—7 of Fig. 3.

The device forming the subject matter of this application preferably is made of metal throughout. It includes a coupling comprising a handle holder and tool tolder H, and a latch slide S mounted to reciprocate on the holder and constituting means for maintaining an earth-working tool releasably assembled with the holder.

The handle holder and tool holder H embodies a tubular socket 5, having an outstanding longitudinal rib 6. At its upper end, the socket 5 is provided with an outstanding flange, preferably an annular washer. Figure 1 shows that, at its upper end, the socket or post 5 has radial ribs 8, and these ribs at their ends are beaten down over the washer 7, as shown at 9 in Fig. 2, to hold the washer in place. A vertical handle 10, of any desired length, is secured in the socket 5. The socket 5 has outstanding radial arms 12, provided with depending fingers 14 (Fig. 2), having side seats 15 (Fig. 6).

The slide or locking device S comprises a head plate 1 having depending keepers 2, there being a circular hole 3 in the head plate, within the space defined by the keepers 2. It is shown in Fig. 5 that the head plate 1 has a radial keyway 4, leading to the hole 3. The hole 3 in the head plate 1 receives the socket 5, and the keyway 4 receives the rib 6 (Fig. 5), to prevent the socket from rotating with respect to the head plate.

A compression spring 11 surrounds the socket 5, the upper end of the spring bearing against the flange 7 of the socket, and the lower end of the spring bearing on the head plate 1. The function of the spring 11 is to depress the slide S with respect to the head plate 1. The keepers 2 on the head plate 1 are long enough so that when the slide S is depressed by the spring 11 until the head plate 1 engages the arms 12, as in Fig. 2, the keepers 2 will extend partway across the seats 15, as Fig. 6 shows.

The coupling is adapted to hold soil working tools of various sorts. One of them is a combined clod cutter and soil working tool C.

The soil working tool C embodies a marginal frame 16 provided with intersecting cross bars 17. Depending, pointed teeth 18 are secured to the cross bars 17, where they intersect, and where the cross bars join the frame 16. On one side, the frame 16 of the tool C has outstanding projections 19. On its opposite side, the frame 16 has an outstanding projection 20.

The slide S is raised, until the keepers 2 on the head plate 1 are above the seats 15 in the fingers 14 of the holder H. Certain of the cross bars 17 of the tool C are engaged in the seats 15, and when the slide S is released, it moves downwardly under the impulse of the spring 11, until the keepers 2 overlap the cross bars 17 of the tool H, thereby holding the tool assembled with the coupling.

It is clear that if the tool C is assembled with the coupling in the position of Fig. 2, with the teeth 18 downwardly extended, the teeth may be used to break up the soil. Disregarding a tamping plate 21 shown in Figs. 3 and 4, if the tool C is connected to the coupling with the teeth 18 pointing upwardly, then the frame 16 and the cross bars 17 may be used to cut clods.

If it is desired to pack the earth, then recourse is had to the tamping plate 21, hereinbefore mentioned. The tamping plate 21 has socketed lugs 22 adapted to receive the projections 19 of the tool C. The tamping plate 21 is provided with a spring latch 23, of any desired construction, adapted to be engaged releasably with the lug 20 of the tool C. The tamping plate 21 may be provided with a spring clip 24, adapted to be engaged with one of the cross bars 17 of the tool C.

When the teeth 18 are depending and in use, as in Fig. 2, the cross bars 17 limit the penetration of the teeth into the soil. When the cross bars 17 are in use, as in Fig. 4 (the tamping plate 21 being omitted), the upstanding teeth 18 act as separators, preventing the subdivided clod material from massing above the cross bars and rendering more difficult a lifting of the tool, preliminary to the making of another downward stroke.

When the tamping plate 21 is mounted in place as shown in Figs. 3 and 4, it will exercise its obvious function.

The device is simple in construction but will be found thoroughly advantageous for the ends in view. The soil may be broken up by the teeth 18, clods may be cut by the cross bars 17, and a tamping of the soil may be effected by means of the plate 21. The soil working members may be assembled readily with the coupling and may be detached readily therefrom. The device will be found useful in the hands of gardeners, and others concerned with the up-keep of lawns.

What is claimed is:

1. In a hand-operated lawn-dressing implement, a holder, a soil-working tool comprising a frame including clod-cutting cross bars and soil-engaging teeth projecting from the cross bars, the frame being reversible to dispose either the teeth or the cross bars in lowermost, working position, the cross bars constituting stops, which limit the penetration of the teeth when the teeth are in depending position, the teeth constituting separators when in upstanding position, and preventing divided clod material from massing above the cross bars and rendering difficult a lifting of the implement, and means for connecting the frame releasably to the holder, with either the teeth or the cross bars uppermost.

2. In a lawn-dressing implement, a holder, a backing frame comprising cross bars, the holder having seats receiving certain of the cross bars, a locking device slidably mounted on the holder and comprising parts which overlap said cross bars and retain them in the seats when the locking device is depressed, spring means engaging the holder and the locking device, to hold the locking device yieldably depressed, a tamping member below and engaging the backing frame, and a releasable connection between the tamping member and the backing frame.

3. In a lawn-dressing implement, an upright post having an upper abutment, a head slidable longitudinally of the post, the head and the post having interengaged parts coacting to prevent relative rotation between the head and the post, the post having outstanding arms merging into depending fingers having side seats, the head having depending keepers overlapping the side seats when the head is depressed until it engages the arms, a depressing compression spring about the post and engaged with the abutment and with the head, a soil working tool in the seats and held therein by the keepers, and an operating handle assembled with the post.

CHARLES W. JOHNSON.